(12) United States Patent
Baker

(10) Patent No.: US 11,059,259 B2
(45) Date of Patent: Jul. 13, 2021

(54) COMPOSITE CORE WITH REINFORCED PLASTIC STRIPS AND METHOD THEREOF

(71) Applicant: Wabash National, L.P., Lafayette, IN (US)

(72) Inventor: Leonard W. Baker, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 15/818,033

(22) Filed: Nov. 20, 2017

(65) Prior Publication Data

US 2018/0141302 A1    May 24, 2018

Related U.S. Application Data

(60) Provisional application No. 62/424,833, filed on Nov. 21, 2016.

(51) Int. Cl.
| | | |
|---|---|---|
| *B32B 3/12* | (2006.01) | |
| *B29D 24/00* | (2006.01) | |
| *B29C 65/18* | (2006.01) | |
| *B32B 37/10* | (2006.01) | |
| *B32B 27/06* | (2006.01) | |
| *B32B 37/06* | (2006.01) | |
| *B32B 37/14* | (2006.01) | |
| *B29C 43/56* | (2006.01) | |

(Continued)

(52) U.S. Cl.
CPC ............. *B32B 3/12* (2013.01); *B29C 43/56* (2013.01); *B29C 65/18* (2013.01); *B29C 66/7254* (2013.01); *B29C 69/00* (2013.01); *B29D 24/005* (2013.01); *B29D 99/0021* (2013.01); *B32B 27/06* (2013.01); *B32B 37/06* (2013.01); *B32B 37/1018* (2013.01); *B32B 37/1027* (2013.01); *B32B 37/146* (2013.01); *B29L 2031/30* (2013.01); *B32B 2605/00* (2013.01)

(58) Field of Classification Search
CPC .... B32B 3/12; B29D 99/0021; B29C 66/7254
USPC ....................................................... 428/116
See application file for complete search history.

(56) References Cited

U.S. PATENT DOCUMENTS

| | | |
|---|---|---|
| 2,294,930 A | 9/1942 | Palmquist |
| 2,719,809 A | 10/1955 | Herts |

(Continued)

FOREIGN PATENT DOCUMENTS

| | | |
|---|---|---|
| CA | 2165016 A1 | 6/1996 |
| EP | 2133184 A1 | 12/2009 |

(Continued)

OTHER PUBLICATIONS

International Search Report and Written Opinion issued in corresponding PCT/US18/15984 dated Apr. 19, 2018, 7 pages.

(Continued)

*Primary Examiner* — Tri V Nguyen
(74) *Attorney, Agent, or Firm* — Quarles & Brady LLP

(57) ABSTRACT

Some embodiments provide a core member for a composite panel that includes a hollow cell network structure, such as a honeycomb arrangement for example, and reinforced plastic strips positioned on a portion of the continuous honeycomb structure. The honeycomb structure and the solid plastic strips may be fastened together using heat and/or pressure applications. Additionally, the method for the production of the core member is provided.

15 Claims, 10 Drawing Sheets

(51) Int. Cl.
  *B29C 69/00* (2006.01)
  *B29C 65/00* (2006.01)
  *B29D 99/00* (2010.01)
  *B29L 31/30* (2006.01)

(56) References Cited

U.S. PATENT DOCUMENTS

| | | | |
|---|---|---|---|
| 2,934,372 A | 4/1960 | Jewell | |
| 3,072,225 A | 1/1963 | Cremer | |
| 3,249,659 A | 5/1966 | Voelker | |
| 3,420,023 A | 1/1969 | Gregori | |
| 3,515,615 A | 6/1970 | Okada | |
| 3,617,351 A | 11/1971 | Long | |
| 3,817,671 A | 6/1974 | Lemelson | |
| 4,128,369 A | 12/1978 | Kemerer et al. | |
| 4,340,129 A | 7/1982 | Salyers | |
| 4,557,100 A | 12/1985 | Gorges | |
| 4,578,297 A | 3/1986 | Duncan | |
| 4,701,369 A | 10/1987 | Duncan | |
| 4,708,757 A | 11/1987 | Guthrie | |
| 4,709,781 A | 12/1987 | Scherzer | |
| 4,783,287 A | 11/1988 | Eichberger et al. | |
| 4,796,397 A | 1/1989 | Capaul | |
| 4,817,264 A | 4/1989 | Worthing | |
| 4,879,152 A | 11/1989 | Green | |
| 4,930,266 A | 6/1990 | Calhoun et al. | |
| 4,940,279 A | 7/1990 | Abott et al. | |
| 5,042,395 A | 8/1991 | Wackerle et al. | |
| 5,066,531 A | 11/1991 | Legg et al. | |
| 5,186,996 A | 2/1993 | Alts | |
| 5,214,991 A | 6/1993 | Shimizu et al. | |
| 5,275,848 A | 1/1994 | Mito et al. | |
| 5,328,744 A | 7/1994 | Kaufmann et al. | |
| 5,507,405 A | 4/1996 | Thomas et al. | |
| 5,554,246 A | 9/1996 | Anwyll, Jr. | |
| 5,580,636 A | 12/1996 | Kampmann et al. | |
| 5,604,021 A | 2/1997 | Wagner | |
| 5,698,308 A | 12/1997 | Sumiya et al. | |
| 5,702,798 A | 12/1997 | Sugita et al. | |
| 5,718,965 A | 2/1998 | Shiroeda et al. | |
| 5,774,972 A | 7/1998 | Ehrlich | |
| 5,779,847 A | 7/1998 | Groeger | |
| 5,851,342 A | 12/1998 | Vydra et al. | |
| 5,860,693 A | 1/1999 | Ehrlich | |
| 5,899,037 A | 5/1999 | Josey | |
| 5,919,545 A | 7/1999 | Giezendanner et al. | |
| 5,979,684 A | 11/1999 | Ohnishi et al. | |
| 5,997,076 A | 12/1999 | Ehrlich | |
| 6,007,890 A | 12/1999 | DeBlander | |
| 6,080,495 A | 6/2000 | Wright | |
| 6,199,939 B1 | 3/2001 | Ehrlich | |
| 6,220,651 B1 | 4/2001 | Ehrlich | |
| 6,266,865 B1 | 7/2001 | Ehrlich | |
| 6,276,748 B1 | 8/2001 | Gobessi et al. | |
| 6,355,302 B1 | 3/2002 | Vandenberg et al. | |
| 6,368,721 B1 | 4/2002 | Watanabe et al. | |
| 6,383,559 B1 | 5/2002 | Nakamura et al. | |
| 6,412,854 B2 | 7/2002 | Ehrlich | |
| 6,537,413 B1 | 3/2003 | Hochet et al. | |
| 6,546,694 B2 | 4/2003 | Clifford | |
| 6,635,202 B1 | 10/2003 | Bugg et al. | |
| 6,638,636 B2 | 10/2003 | Tucker | |
| 6,680,017 B1 | 1/2004 | Koch et al. | |
| RE38,508 E | 4/2004 | Wright | |
| 6,824,851 B1 | 11/2004 | Locher et al. | |
| 6,843,525 B2 | 1/2005 | Preisler | |
| 6,852,386 B2 | 2/2005 | Nadezhdin et al. | |
| 6,866,492 B2 | 3/2005 | Rauber et al. | |
| 6,986,546 B2 | 1/2006 | Ehrlich | |
| 7,014,253 B2 | 3/2006 | Oren | |
| 7,017,981 B2 | 3/2006 | Strohmavr et al. | |
| 7,056,567 B2 | 6/2006 | ONeill et al. | |
| 7,069,702 B2 | 7/2006 | Ehrlich | |
| 7,128,365 B2 | 10/2006 | Kiesewetter et al. | |
| 7,155,797 B2 | 1/2007 | Kim | |
| 7,255,822 B2 | 8/2007 | Bledsoe et al. | |
| 7,338,696 B2 | 3/2008 | Rambaud et al. | |
| 7,540,932 B2 | 6/2009 | Rub et al. | |
| 7,553,435 B2 | 6/2009 | McCollum | |
| 7,722,112 B2 | 5/2010 | Ehrlich | |
| 7,722,122 B2 | 5/2010 | Mittelstadt | |
| 7,758,487 B2 | 7/2010 | Elsayed et al. | |
| 7,785,518 B2 | 8/2010 | Wirt et al. | |
| 7,814,658 B2 | 10/2010 | Akishev et al. | |
| 7,842,147 B2 | 11/2010 | Shen et al. | |
| 8,087,494 B2 | 1/2012 | Palumbo et al. | |
| 8,273,208 B2 | 9/2012 | Brinner | |
| 8,336,933 B2 | 12/2012 | Nagwanshi et al. | |
| 8,474,583 B2 | 7/2013 | Nagwanshi et al. | |
| 8,524,351 B2 | 9/2013 | Ross | |
| 8,584,433 B2 | 11/2013 | Masuda | |
| 8,663,523 B2 | 3/2014 | Bradford et al. | |
| 8,690,233 B2 | 4/2014 | Preisler et al. | |
| 8,726,613 B2 | 5/2014 | Rhee et al. | |
| 8,764,089 B2 | 7/2014 | Preisler et al. | |
| 8,770,344 B2 | 7/2014 | Borroni | |
| 8,795,465 B2 | 8/2014 | Preisler et al. | |
| 8,795,807 B2 | 8/2014 | Preisler et al. | |
| 8,808,827 B2 | 8/2014 | Preisler et al. | |
| 8,808,828 B2 | 8/2014 | Preisler et al. | |
| 8,808,829 B2 | 8/2014 | Preisler et al. | |
| 8,808,830 B2 | 8/2014 | Preisler et al. | |
| 8,808,831 B2 | 8/2014 | Preisler et al. | |
| 8,808,833 B2 | 8/2014 | Preisler et al. | |
| 8,808,834 B2 | 8/2014 | Preisler et al. | |
| 8,808,835 B2 | 8/2014 | Preisler et al. | |
| 8,834,985 B2 | 9/2014 | Preisler et al. | |
| 8,845,947 B2 | 9/2014 | Wirt et al. | |
| 8,852,711 B2 | 10/2014 | Preisler et al. | |
| 8,859,074 B2 | 10/2014 | Preisler et al. | |
| 8,883,285 B2 | 11/2014 | Preisler et al. | |
| 8,945,327 B2 | 2/2015 | Stamp et al. | |
| 8,995,138 B2 | 3/2015 | Preisler et al. | |
| 9,010,834 B2 | 4/2015 | Preisler et al. | |
| 9,126,537 B2 | 9/2015 | Preisler et al. | |
| 9,283,895 B2 | 3/2016 | Sumi et al. | |
| 9,308,945 B2 | 4/2016 | Preisler et al. | |
| RE45,991 E | 5/2016 | Preisler et al. | |
| 9,346,375 B2 | 5/2016 | Preisler et al. | |
| 9,550,336 B2 | 1/2017 | Bradford | |
| 9,908,315 B2 | 3/2018 | Speer | |
| 10,239,566 B2 | 3/2019 | Bauer et al. | |
| 2001/0011832 A1 | 8/2001 | Ehrlich et al. | |
| 2002/0014302 A1 | 2/2002 | Fanucci et al. | |
| 2002/0098341 A1 | 7/2002 | Schiffer et al. | |
| 2002/0109377 A1 | 8/2002 | Ehrlich | |
| 2002/0176960 A1 | 11/2002 | Nadezhdin et al. | |
| 2003/0186029 A1 | 10/2003 | Ogawa et al. | |
| 2004/0055248 A1* | 3/2004 | Grillos | E04C 2/365 52/783.1 |
| 2004/0217631 A1 | 11/2004 | Ehrlich | |
| 2005/0087899 A1 | 4/2005 | Coon et al. | |
| 2005/0123720 A1 | 6/2005 | Suzuki et al. | |
| 2005/0204561 A1 | 9/2005 | Kim | |
| 2005/0225118 A1 | 10/2005 | Oren | |
| 2005/0257893 A1 | 11/2005 | Rub et al. | |
| 2006/0028050 A1 | 2/2006 | Ehrlich | |
| 2006/0241542 A1 | 10/2006 | Gudnason et al. | |
| 2007/0004813 A1 | 1/2007 | Shelby et al. | |
| 2007/0056687 A1 | 3/2007 | Brinner | |
| 2007/0196681 A1 | 8/2007 | Biggs et al. | |
| 2007/0256379 A1 | 11/2007 | Edwards | |
| 2008/0111393 A1 | 5/2008 | Ehrlich | |
| 2008/0116718 A1 | 5/2008 | Lewallen et al. | |
| 2009/0202785 A1 | 8/2009 | Meyer Zu Drewer et al. | |
| 2009/0206631 A1 | 8/2009 | Lewallen et al. | |
| 2009/0297763 A1* | 12/2009 | Ross | B32B 5/02 428/116 |
| 2009/0324905 A1 | 12/2009 | Welch et al. | |
| 2010/0227087 A1 | 9/2010 | Naldi | |
| 2011/0089183 A1 | 4/2011 | Gundelsheimer | |
| 2011/0095574 A1* | 4/2011 | Brown | E04C 3/02 296/204 |
| 2011/0135862 A1 | 6/2011 | Sumi et al. | |

(56) References Cited

U.S. PATENT DOCUMENTS

| | | |
|---|---|---|
| 2011/0250384 A1 | 10/2011 | Sumi et al. |
| 2012/0040135 A1* | 2/2012 | Werthen .................. B32B 3/08 428/138 |
| 2014/0044914 A1 | 2/2014 | Kunz et al. |
| 2014/0127452 A1 | 5/2014 | Dietz et al. |
| 2014/0178636 A1 | 6/2014 | Wu et al. |
| 2014/0345795 A1 | 11/2014 | Speer |
| 2014/0349077 A1 | 11/2014 | Sumi et al. |
| 2015/0130220 A1 | 5/2015 | Preisler et al. |
| 2015/0130221 A1 | 5/2015 | Preisler et al. |
| 2015/0132532 A1 | 5/2015 | Preisler et al. |
| 2015/0145276 A1 | 5/2015 | Preisler et al. |
| 2015/0273810 A1 | 10/2015 | Carretta |
| 2015/0306840 A1 | 10/2015 | Ferguson, Jr. |
| 2016/0176149 A1 | 6/2016 | Manderfeld et al. |

FOREIGN PATENT DOCUMENTS

| | | |
|---|---|---|
| JP | H0387461 A | 4/1991 |
| JP | 2003285397 A | 10/2003 |
| JP | 2005238622 A | 9/2005 |
| WO | 9014943 A1 | 12/1990 |
| WO | 9300845 A1 | 1/1993 |
| WO | 0024559 A1 | 5/2000 |
| WO | 0244493 A1 | 6/2002 |
| WO | 2005077654 A1 | 8/2005 |
| WO | 2006128632 A1 | 12/2006 |
| WO | 2008141688 A2 | 11/2008 |
| WO | 2010050242 A1 | 5/2010 |
| WO | 2010069994 A2 | 6/2010 |

OTHER PUBLICATIONS

Non-Final Rejection dated Sep. 1, 2009, for U.S. Appl. No. 11/859,014, 8 pages; obtained from USPTO records, now U.S. Pat. No. 9,908,315.

Non-Final Rejection dated Oct. 1, 2013, for U.S. Appl. No. 13/204,762, 18 pages; obtained from USPTO records, now U.S. Pat. No. 9,908,315.

Final Rejection dated Apr. 9, 2014, for U.S. Appl. No. 13/204,762, 17 pages; obtained from USPTO records, now U.S. Pat. No. 9,908,315.

International Search Report and Written Opinion issued in corresponding PCT/US2018/018151 dated Apr. 5, 2018, 6 pages.

\* cited by examiner

COMPOSITE CORE WITH REINFORCED PLASTIC STRIPS AND METHOD THEREOF

RELATED APPLICATIONS

This application claims priority under 35 U.S.C. § 119 to U.S. Provisional Patent Application No. 62/424,833 filed on Nov. 21, 2016, the entire contents of which is incorporated herein by reference.

BACKGROUND

Many storage trailers, including those for commercial trucking, consist of sidewalls and doors constructed from composite materials. Composite materials may have a plastic core disposed between two outer metal sheets. For example, Wabash National Corporation of Lafayette, Ind. makes DURAPLATE® composite panels that have a high-density polyethylene plastic core (HDPE) fastened between two high-strength, high-tension steel plates. Composite materials utilizing a plastic core may also be used in a variety of other fields including furniture construction, vehicle construction, ship construction, aircraft construction, or generally anywhere where a high strength material at a low weight is desired.

Typical composite cores may be constructed from a plurality of structures including a network of cells. One such network of cells is made from an arrangement of hexagons that produce a honeycomb structure with alternating geometric structures and air pockets. In some instances, these composite cores use less plastic than completely solid composite cores, cutting down on material costs. Additionally, the composite cores weigh less than completely solid cores and have higher density to strength ratios.

For example, International Publication No. WO 2008/141688 A2 discloses a folded honeycomb structure produced from a continuous web of material. The honeycomb structure is produced by deforming the material to form a plurality of half-hexagonal cell walls, then folding the half-hexagonal cell walls in the direction of conveyance to cause the cell walls to meet and, as a result, form a honeycomb structure.

Composite cores and, in particular, honeycomb cores may provide a core with high component stiffness at low weight. However, the composite cores may lack the strength required for mechanical fastening used in many commercial applications.

SUMMARY

Some embodiments provide a method of continuously producing a core for a composite panel along a single production line. The method includes the steps of providing a thermoplastic sheet of material onto a production line, vacuum forming the thermoplastic sheet of material into alternating pairs of shapes, and providing the thermoplastic sheet of material with shapes onto a conveyor belt. The conveyor belt may also operate at a lower speed than a speed of the production line to cause the pairs of shapes to bunch up and form a honeycomb structure. Further, the method may include operating the production line in a first state of operation for a first time period to form the honeycomb structure and operating the production line in a second state of operation different from the first state of operation to form a gap in the honeycomb structure. The method may also include the steps of inserting a reinforced strip of material into the gap and fastening the reinforced strip and the honeycomb structure together.

In particular embodiments, the method may also include the production line being operated for a second time period that is less than the first time period. In some embodiments, the production line may be operated for a predetermined amount of time, and the first time period may range from about 88% to about 92% of the predetermined amount of time and the second time period may range from about 8% to about 12% of the predetermined amount of time. The width dimension of the gap formed in the honeycomb structure may range between about 0.25 meters to about 0.4 meters.

Some embodiments of the method may also include the second state of operation comprising the step of interrupting the vacuum forming step. In other embodiments, the second state of operation includes the step of increasing an operating speed of the production line from a normal speed to an accelerated speed. In particular embodiments, a normal speed may range from about 2.5 meters per minute to about 4 meters per minute and the accelerated speed may range from about 4 meters per minute to about 6 meters per minute.

The method may also include the step of inserting the reinforced strip and the honeycomb structure into a calibration press. Further, in some embodiments, the second state of operation may include the step of compressing a portion of the honeycomb structure using a heated platen press.

Other embodiments provide a composite panel comprising an inner sheet and an outer sheet disposed opposite of the inner sheet, and a core member positioned between the inner and outer sheets. Further, the core member comprises a partially hollow structure interrupted by a substantially continuous gap extending between a first edge and second edge of the core member.

Some additional embodiments provide a composite panel including an inner sheet and an outer sheet disposed opposite of the inner sheet, and a core member positioned between the inner and outer sheets. The core member may include a partially hollow structure and a reinforced material. Further, the reinforced material may be fastened to the partially hollow structure.

The reinforced material may be fastened to the partially hollow structure adjacent a first end thereof. Additionally, the reinforced material may be fastened to the partially hollow structure adjacent a second end thereof. In some embodiments, the partially hollow structure may be at least 80% of a volume of the core member and, in particular embodiments, the partially hollow structure may be at least 95% of the volume of the core member.

The reinforced material may be selected from the group consisting of high density polyethylene, high density polypropylene, low density polyethylene, polyethylene terephthalate, polypropylene, and/or combinations thereof. The composite panel may also have a length dimension ranging between about 2.5 meters to about 3.5 meters and may have a width dimension ranging between about 1 meter to about 2 meters.

Some embodiments provide the partially hollow structure as a network of hexagonal cells. The partially hollow structure and the reinforced material may have the same composition, but have a different volumetric mass density.

Some additional embodiments provide a method of continuously producing a core for a composite panel along a single production line. The method may include the steps of providing a thermoplastic sheet of material onto a production line operating at a predetermined speed, vacuum forming the thermoplastic sheet of material into alternating pairs of matching shapes, and providing the thermoplastic sheet of material with pairs of matching shapes onto a conveyor belt. The conveyor belt may operate at a lower speed than the predetermined speed of the production line to cause the pairs of matching shapes to bunch up and form a honeycomb structure. Further, the method may also include the steps of operating the production line for a first time period to form the honeycomb structure and operating the production line at an increased speed for a second time period to collapse at least a portion of the honeycomb structure.

It will be appreciated by those skilled in the art that while the invention has been briefly described above in connection with particular embodiments and examples, the invention is not necessarily so limited, and that numerous other embodiments, examples, uses, modifications and departures from the embodiments, examples and uses are intended to be encompassed herein.

DETAILED DESCRIPTION

Figure 1:
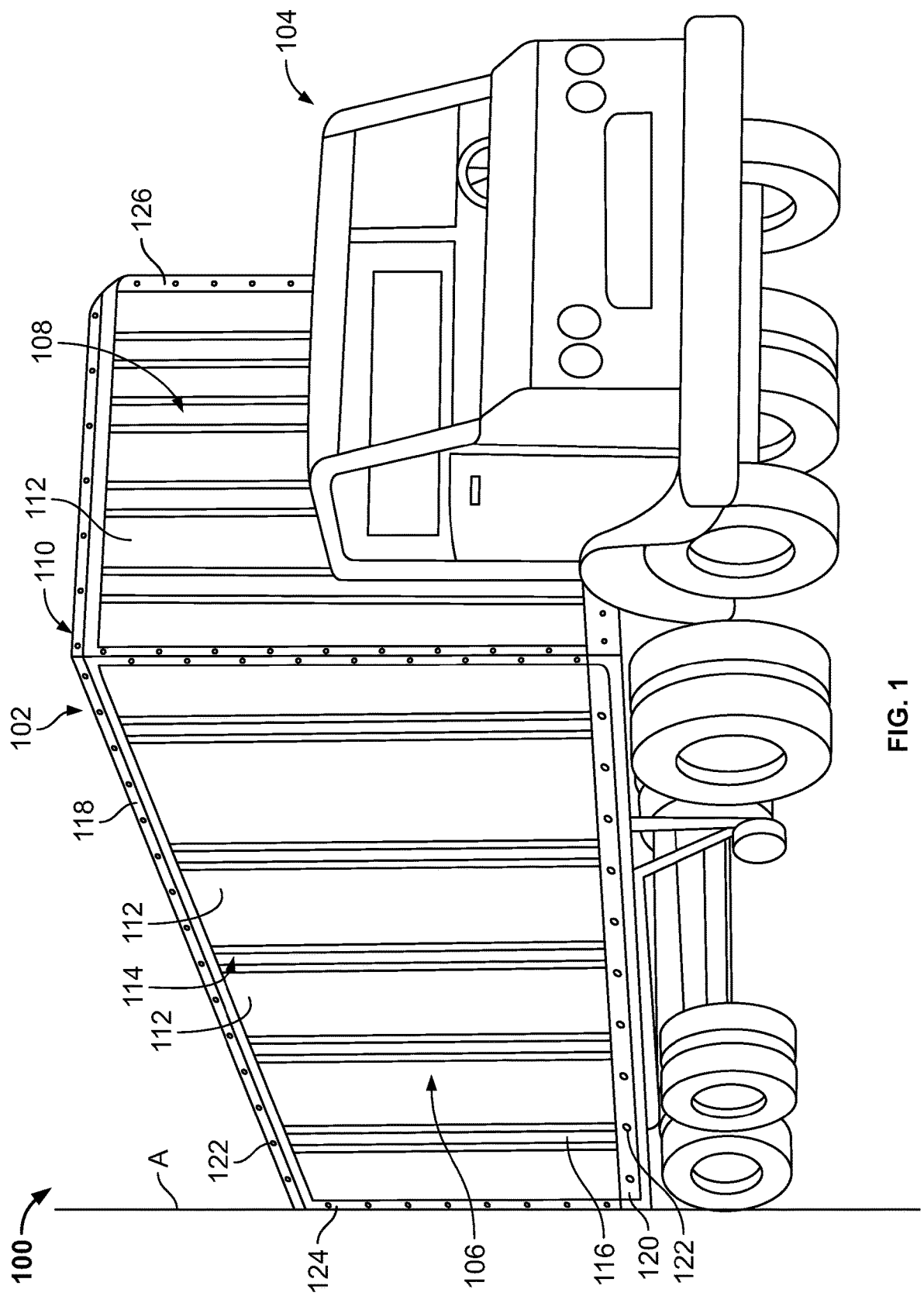
FIG. 1 is a perspective view of a commercial tractor trailer having sidewalls that include a plurality of composite panels.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 depicts a tractor trailer assembly 100 consisting of a trailer 102 designed to carry cargo and a tractor 104 having an engine and a cab section. The trailer 102 is substantially rectangular and is defined by a roof assembly 110 and a floor assembly (not depicted) disposed opposite the roof assembly 110. The roof assembly 110 and the floor assembly are coupled to opposite sidewalls 106, a front end wall assembly 108, and a rear end wall assembly (not shown), which may include an overhead door. Alternatively, the rear end wall assembly may include two doors mounted in a conventional manner such that the doors are hingedly coupled to and swing between an open position and a closed position. Further, the trailer 102 may be releasably coupled to the tractor 104 by conventional means, such as a fifth wheel, for example.

Portions of each sidewall 106, the front end wall assembly 108, the roof assembly 110, the floor assembly, and/or the rear end wall assembly of the trailer 102 may be made from one or more composite panels 112. The composite panels 112 may be coupled to each other using a number of different fasteners and/or joint configurations. In one embodiment, the composite panels 112 are coupled to each other via joint configurations 114 including a logistics plate (not shown) and/or a splicing plate 116. In some embodiments, the composite panels 112 may be coupled together along a longitudinal axis using rivets, screws, welding adhesives or the like.

Additionally, as shown in FIG. 1, the composite panels 112 may be coupled to a top rail 118 and a bottom rail 120 using a plurality of fasteners 122, e.g., rivets, screws, adhesives, or the like. One or more composite panels 112 may also be coupled to one or more vertically oriented rails 124, 126 that are aligned with and substantially parallel to a longitudinal axis A of the trailer 102 using a fastener 122, e.g., a rivet. The vertical rails 124, 126 may be disposed between the panels 112 at various points along the length of the trailer 102. Other joint configurations and other fasteners, for example, screws, bolts, nails, welding adhesives, and the like, may also be used to couple adjacent composite panels 112 together, composite panels 112 to the top rail 118 and/or the bottom rails 120, and/or the composite panels 112 to the vertical rails 124, 126.

Figure 2:
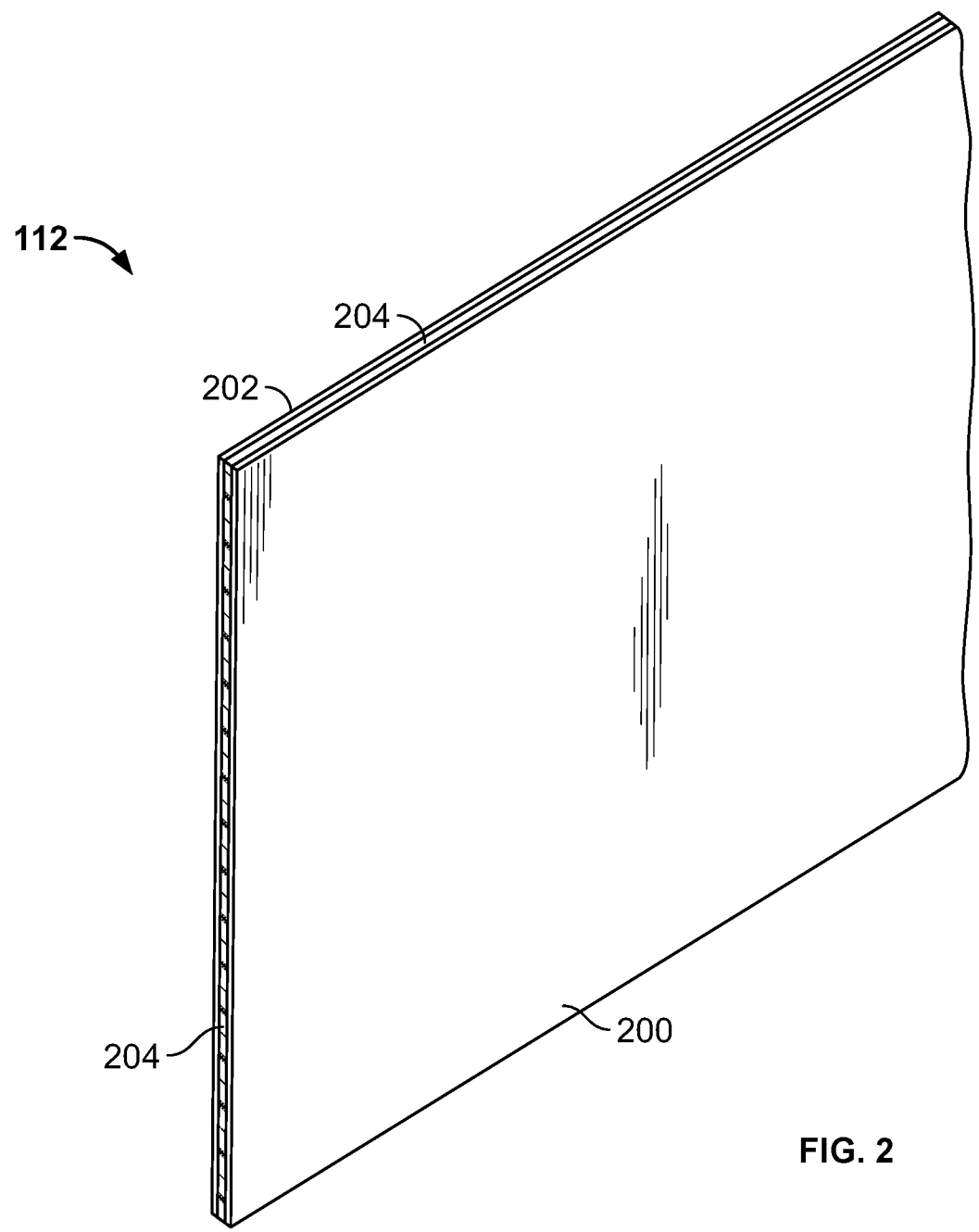
FIG. 2 is an isometric view of a portion of one of the composite panels of FIG. 1 having two outer sheets and a core member.

FIG. 2 depicts a portion of one composite panel 112 that is provided in the form of an inner sheet 200, an outer sheet 202 positioned opposite of the inner sheet 200, and a core member 204 positioned between the inner sheet 200 and the outer sheet 202. The inner sheet 200 and outer sheet 202, independently, may be formed from high-strength, high-tension steel plates, aluminum, other metals, and/or other alloys. The inner sheet 200 and outer sheet 202 may also be formed from other materials including, for example, bioplastics, wood, thermoplastic, polymers, and other materials. Further, the core member 204 is provided in the form of a thermoplastic material that will be described in more detail below.

The inner sheet 200 and the outer metal sheet 202 may be bonded to the core member 204 by a suitable adhesive layer (not shown). In one embodiment, the inner sheet 200 and the outer sheet 202 are bonded to the core member 204 by a suitable flexible adhesive bonding film such as, for example, modified polyethylene. It may be understood that other suitable adhesives or joining mechanisms may also be used as well. When fully assembled, the outer sheets 202 of each panel 112 cooperate to form an exterior surface of the sidewalls 106, the front end wall assembly 108, and/or the rear end wall assembly (not shown) of the trailer 102, while the inner sheets 200 of each panel 112 cooperate to form an interior surface of the sidewalls 106, the front end wall assembly 108, and/or the rear end wall assembly (not shown) of the trailer 102.

Figure 3:
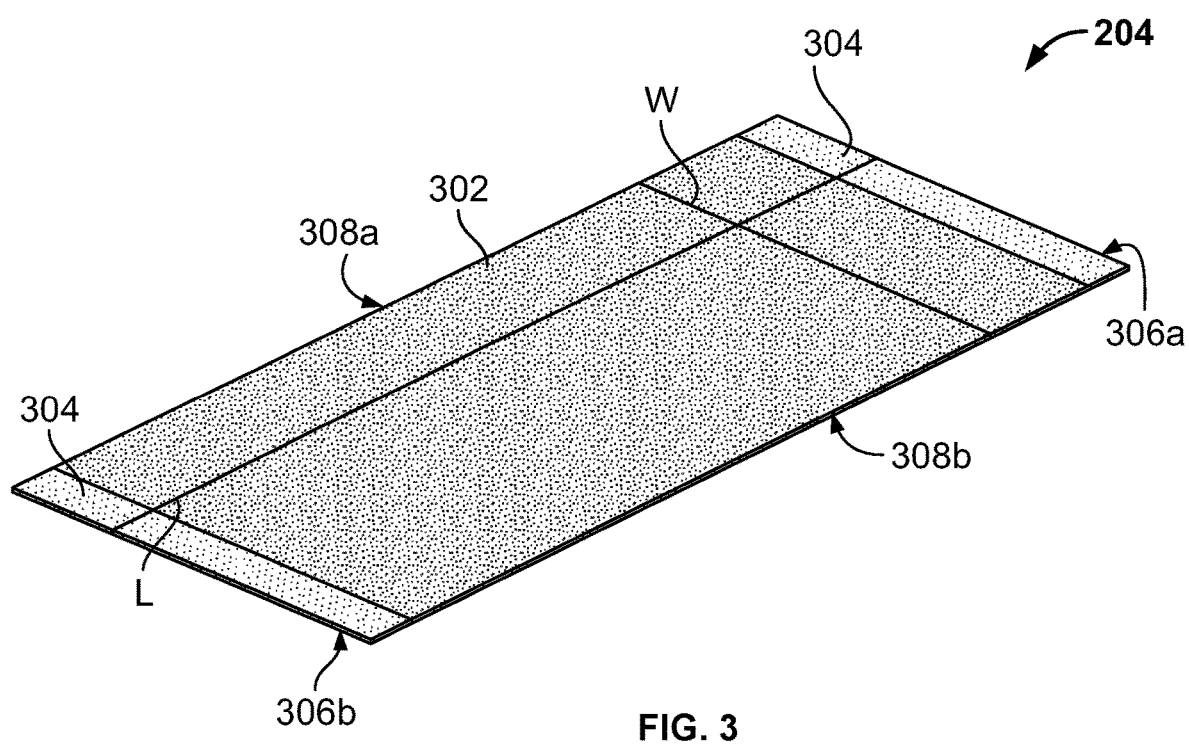
FIG. 3 is an isometric view of the core member of the panel of FIG. 2 showing a portion of a continuous honeycomb structure and two reinforced sections.

FIG. 3 depicts one embodiment of the core member 204 of a single composite panel 112, which is substantially rectangular and generally corresponds to the shape and size of each of the inner sheet 200 and the outer sheet 202. The core member 204 is defined by a first end 306a and a second end 306b disposed at opposing ends of the core member 204, and a first lateral edge 308a and a second lateral edge 308b, on opposing sides of the core member 204. Illustratively, the first end 306a and the second end 306b define a length dimension L of the core member 204, and the first lateral edge 308a and the second lateral edge 308b define a width dimension W of the core member 204.

The core member 204 may be provided in a variety of shapes and sizes. With reference to FIG. 3, the length dimension L and the width dimension W of the core member 204 may generally define the size and shape of the core member 204. In some embodiments, the length dimension L may range between about 1 meter to about 16 meters. In particular embodiments, the length dimension L may range from about 2 meters to about 4 meters, or between about 2.5 meters to about 3 meters. Further, in some embodiments, the width dimension W may range between about 0.5 meters to about 4 meters. In particular embodiments, the width dimension W may range between about 0.75 meters to about 2 meters, or between about 1 meter to about 1.5 meters. The core member 204 may also have a predetermined height or thickness. In some embodiments, the core member 204 has a predetermined thickness between about 3 millimeters to about 15 millimeters and, in particular embodiments, the core member 204 may have a predetermined thickness between about 5 millimeters to about 10 millimeters. It should be understood that the length, width, and thickness dimensions of the core member 204 may be modified such that the core member 204 would be suitable in other applications referenced herein.

The core member 204 may also be defined by a first section 302 and one or more second sections 304. The second section 304 may be structurally different with respect to the first section 302 and/or each other. Further, the second section 304 may be materially or compositionally different with respect to the first section 302 and/or to another second section 304.

More specifically, the first section 302 is typically provided in the form of a continuous, partially hollow honeycomb thermoplastic cell network or a honeycomb structure. In this particular embodiment, the continuous honeycomb thermoplastic cell network may include a plurality of hexagonal cells that are substantially hollow. In other embodiments, the honeycomb structure 302 may include a cell network of polygonal, arcuate, and/or sinusoidal cells that are substantially hollow. Although the first section/honeycomb structure 302 is typically described as a honeycomb structure throughout, it should be appreciated that the first section 302 may comprise another material that is defined by a lower density than that of the material of the second section 304.

In some embodiments, the honeycomb structure 302 extends entirely between the first lateral edge 308a and the second lateral edge 308b, and extends in the length dimension of the core member 204 almost the entire length thereof, but terminates adjacent the second sections 304, described in more detail below. In alternative embodiments, the first section extends in the width dimension of the core member almost the entire length thereof, but terminates adjacent a second section. In these alternative embodiments, the second sections define the first lateral edge 308a and/or the second lateral edge 308b of the core member 204. In yet another embodiment, a portion of the second sections may define the first lateral edge 308a, the second lateral edge 308b, the first end 306a, and/or the second end 306b to form a rectangle, with the honeycomb structure 302 positioned within the second sections.

In some embodiments, the honeycomb structure 302 comprises over about 80%, or over about 90%, or over about 95% of the entire volume of the core member 204. The first section 302 is designed to reduce the weight of the core member 204, as compared to a core member having a completely solid core structure, while maintaining a desired core strength. Furthermore, the honeycomb structure 302 uses less plastic as compared to a solid plastic core material. It should be understood that the honeycomb cell network may be formed from other hollow webbed structures (including, for example, squares, parallelograms, triangles, polygons, arcuate shapes, sinusoidal structures, and the like) and is not be limited to hexagonal honeycomb structures.

The second section 304 of the core member 204 is generally defined by a reinforced material. In some embodiments, the reinforced material is a solid or a substantially solid material and, in particular embodiments, is a solid or substantially solid plastic material. In one embodiment, as shown in FIG. 3, the reinforced material 304 includes two strips of solid plastic reinforced material located adjacent both the first end 306a and the second end 306b of the core member 204. The reinforced material 304 is also defined by a greater volumetric density as compared to the honeycomb structure 302.

The core member 204 may have two solid reinforced plastic materials 304, which may be welded or otherwise secured to the honeycomb structure 302 at opposing ends thereof. The reinforced material 304 may be designed to be coupled to the top rail 118 and/or the bottom rail 120 of the trailer 102 by a suitable joining member or fastener 122, such as the aforementioned bolts or rivets, for example. In particular, the addition of one or more solid reinforced materials 304 into the core member 204 significantly increases the strength of the composite panel 112 in certain desired locations, e.g., a location of fastening. Additionally, the solid reinforced material 304 increases the fastener pull out strength when compared to composites that comprise complete honeycomb material cores. In effect, the reinforced material 304 may be positioned so that when the composite panel 112 is attached to the top rail 118, for example, the fastener 122 extends through the reinforced material 304 of the core member 204, as opposed to extending through the honeycomb structure 302. It should be understood that the reinforced material 304 may also be positioned along one or more of the first lateral edge 308a, the second lateral edge 308b, or any area in or around the honeycomb structure 302 where additional strength may be desired.

The honeycomb structure 302 and the reinforced material 304 of the core member 204 are formed from a thermoplastic, such as a high density polyethylene, i.e., HDPE, or a high density polypropylene. However, the honeycomb structure 302 and second section 304 may be formed from other suitable materials. For example, the honeycomb structure 302 and the second section 304 may each, individually, be formed from a low density polyethylene, e.g., LDPE, a polyethylene terephthalate, e.g., PET, a polypropylene, e.g., PP, or the like. Although the materials of the honeycomb structure 302 and the reinforced material 304 of the core member 204 may comprise the same material, the process and methodology to form the honeycomb structure 302 and the second section 304 of the core member 204 may be different with respect to each other and is described in more detail below. As a result, the honeycomb structure 302 and the reinforced material 304 of the core member 204 are defined by different properties including, for example, density, tensile strength, and the like.

Figure 4:
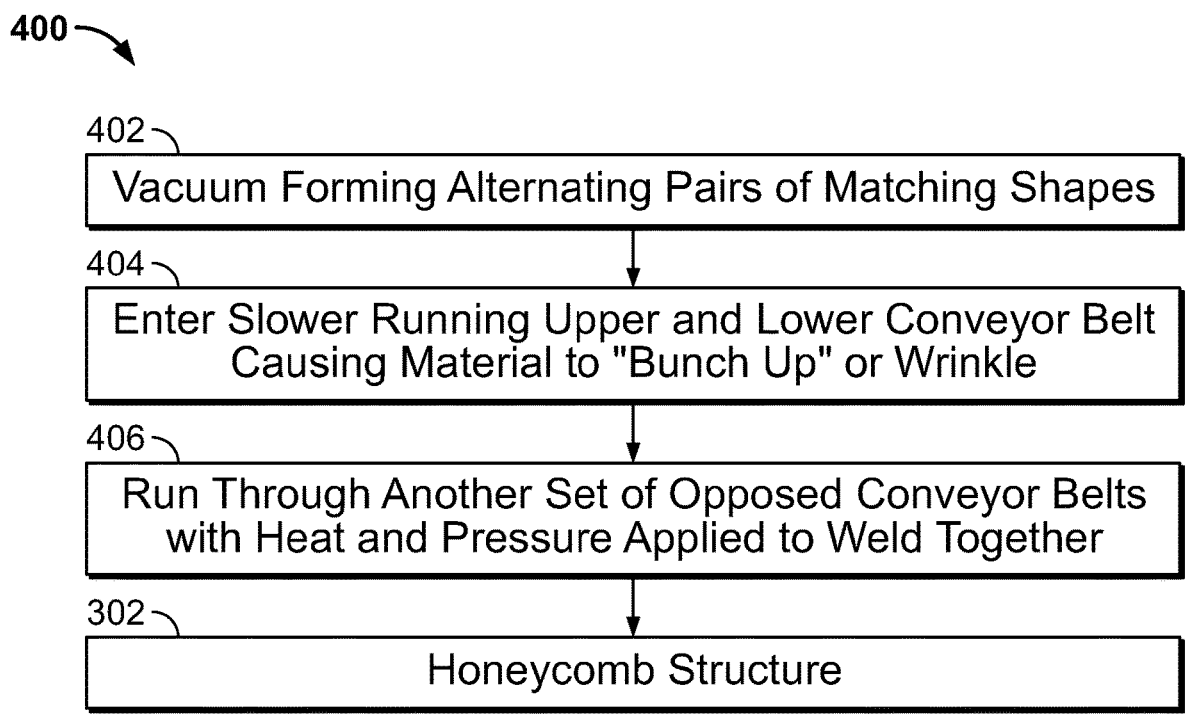
FIG. 4 is a flow chart for an example methodology used to make the continuous honeycomb structure of FIG. 3.
Figure 5:
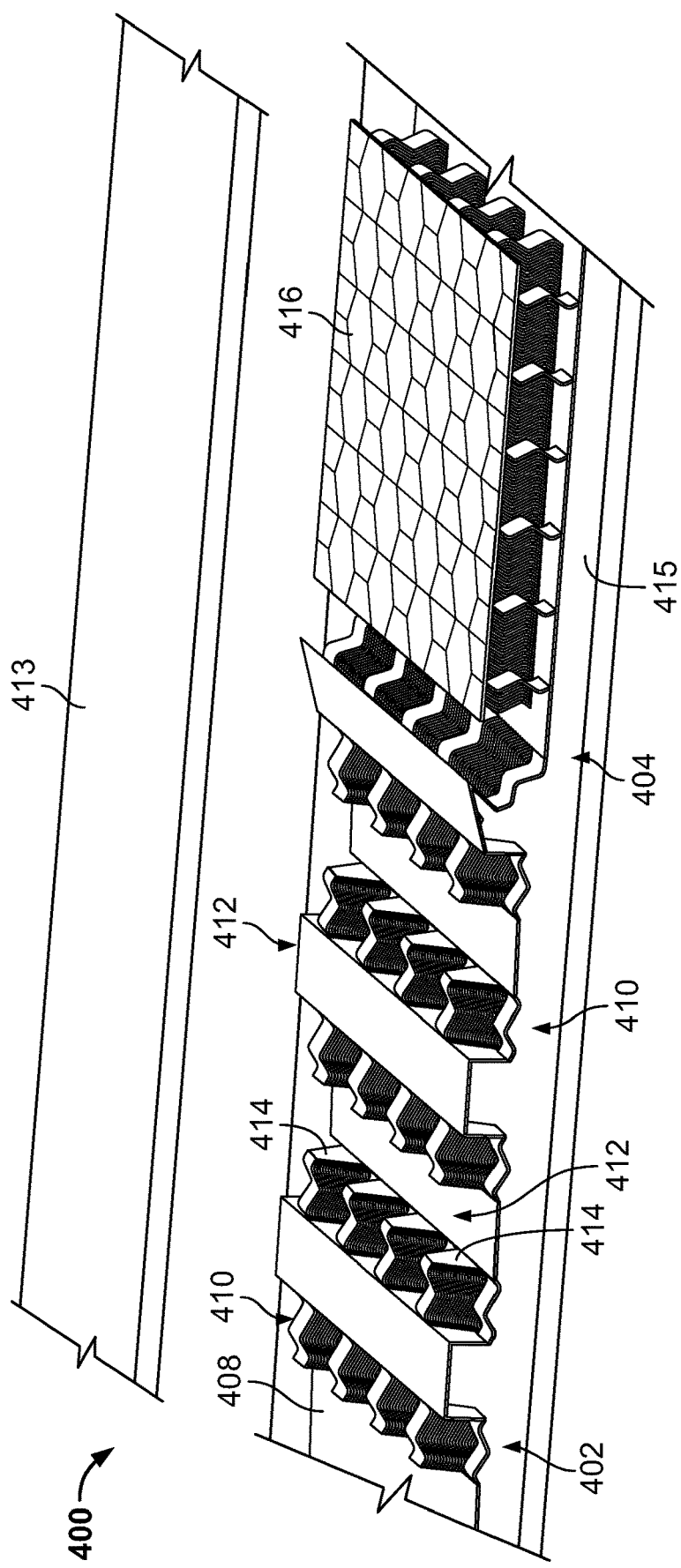
FIG. 5 is an isometric view of a portion of a plurality of panels on a production line undergoing the method of FIG. 4.

FIGS. 4 and 5 depict an illustrative process or method 400 for making the honeycomb structure 302 of the core member 204. Exemplary processes or methods for making a honeycomb structure are described in detail in International Publication No. WO 2008/141688 A2, the entirety of which is hereby incorporated by reference herein. Generally, the process 400 is schematically illustrated with steps 402, 404, and 406. In most embodiments, a flat sheet 408 of thin deformable material may be fed to the process 400 as a starting material. For example, the flat sheet 408 may be one of a thermoplastic polymer, a low density polyethylene, a polyethylene terephthalate, a polypropylene, a fiber composite, a plastically deformable paper, a deformable metal sheet, or the like.

Initially, step 402 comprises the step of vacuum forming the thin sheet 408 into alternating pairs of matching shapes. In particular embodiments, the sheet 408 may be intermittingly vacuum formed to produce a plurality of deformed regions 410 and a plurality of non-deformed regions 412 positioned therebetween. The deformed regions 410 are generally three-dimensional and include one or more individual cells 414 of predetermined shape and size. As will be described in greater detail below, the predetermined shape and size of the cells 414 determine the structure of the honeycomb structure 302 of the core member 204. For example, in a particular embodiment shown in FIG. 5, the cells 414 are substantially trapezoidal to produce, when folded, a honeycomb structure. Alternative embodiments may include a cell with a polygonal structure, a sinusoidal or arcuate shape, a rectangular design, or the like. Further, the walls of the cells 414 may be substantially linear, bowed, curved, etc. to produce the honeycomb structure 302 with a desired structure.

In the next step 404, the vacuum formed mating pairs or cells 414 enter onto a conveyor belt. In some embodiments, the conveyor belt includes an upper conveyor belt 413 and a lower conveyor belt 415 that are running at a speed that is relatively slower than a speed of the incoming material. The slower speed of the lower conveyor belt 415 may cause the incoming vacuum formed mating pairs or cells 414 to bunch up, wrinkle, and/or stand up to produce a plastic network 416, e.g., a plastic honeycomb network. For example, in the embodiment shown in FIG. 5, the material is formed into alternating pairs of trapezoidal cells that, when folded, form completed hexagonal shapes.

Finally, in step 406, the bunched up honeycomb structure or plastic network 416 enter a second conveyor belt (not shown). In particular embodiments, the second conveyor belt is provided as opposed conveyor belts, i.e., one conveyor positioned above the plastic network 416 and one conveyor positioned below the plastic network 416. Further, the conveyor belts may apply a predetermined amount of heat at a predetermined temperature and/or a predetermined amount of force may be applied at a predetermined pressure to consolidate and/or weld the plastic network 416 together to produce a honeycomb structure 302. Additional heat and/or pressure may be applied in step 406 to calibrate the honeycomb structure 302 to the desired final thickness and/or the desired final height.

The predetermined temperature applied in step 406 may range between about 40° C. to about 250° C. In some embodiments, the predetermined temperature may range between about 100° C. to 200° C. or between about 160° C. to about 190° C. Further, the predetermined pressure may range from about 1 MPa to about 100 MPa. In particular embodiments, the predetermined pressure may range between about 15 MPa to about 40 MPa, or between about 25 MPa to about 30 MPa. The heat and/or pressure may be applied for a predetermined amount of time in order to consolidate and/or weld the plastic network 416 together and/or weld the honeycomb structure 302 to the reinforced material 304. Further, the heat and/or pressure may be applied for a predetermined amount of time in order to calibrate the honeycomb structure 302 to a desired thickness.

Figure 6:
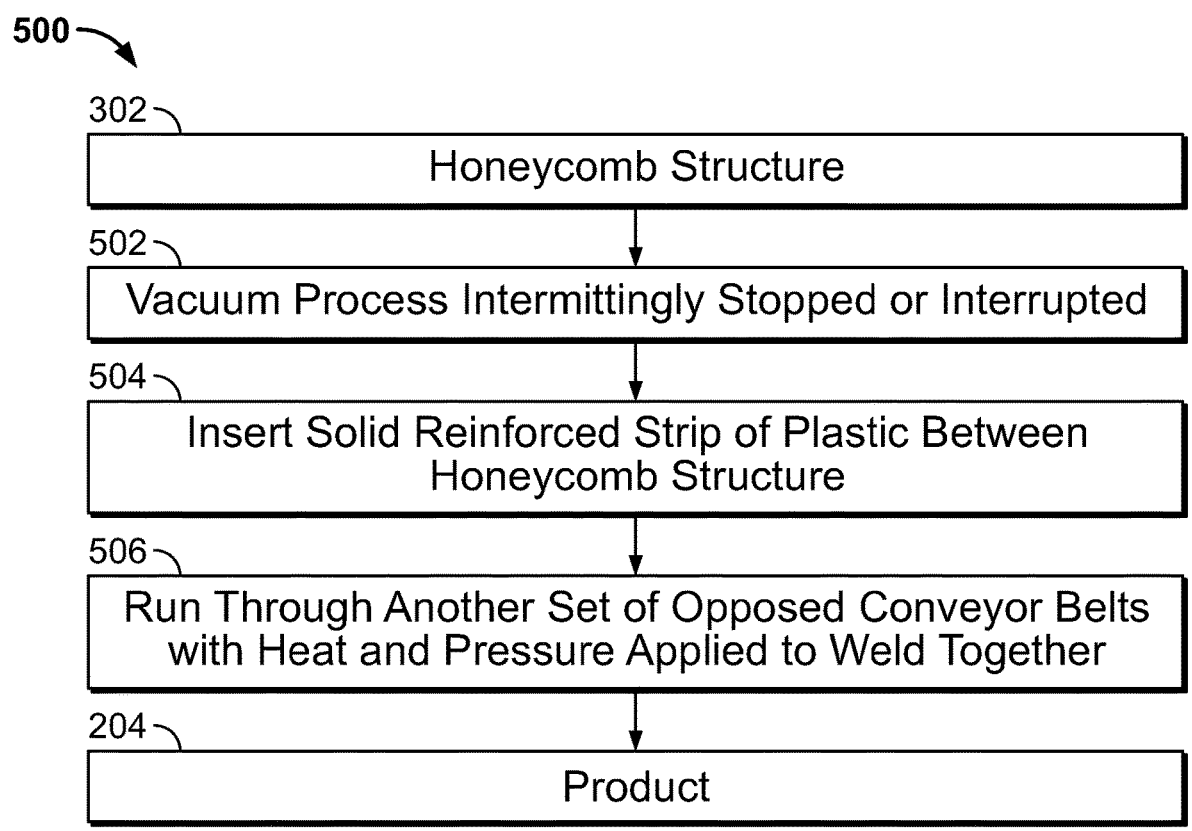
FIG. 6 is a flow chart for an example methodology used to make the core member of FIG. 3 with the reinforced sections.
Figure 7:
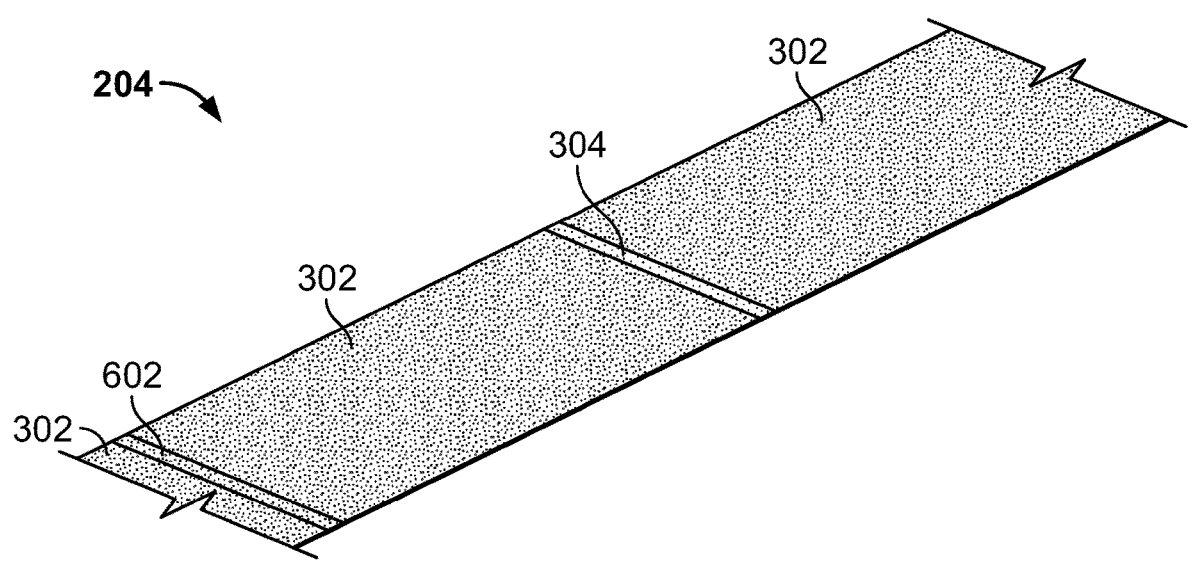
FIG. 7 is an isometric view of a portion of a plurality of panels on a production line.
Figure 8:
FIG. 8 is a side elevational view of the plurality of panels of FIG. 7.

FIG. 6 depicts an illustrative process or method 500 for making the core member 204 having the reinforced material 304 positioned therein. The process 500 is schematically illustrated with multiple steps 502, 504, and 506. Furthermore, the honeycomb structure 302 from the process 400 is typically the starting material for the process 500. In step 502, the vacuum forming process occurring in step 402 of the process 400 is intermittently turned off or interrupted. In one embodiment, the vacuum forming step 402 of the process 400 is turned off to produce a non-deformed region substantially larger than the non-deformed region 412. In some embodiments, a length of the non-deformed region produced by step 502 is between about two times to about four times and, in particular embodiments, between about two times to about three times a standard length of the non-deformed region 412. As a result, after the vacuum forming step 402 of the process 400 is interrupted and, consequently, after the cells 414 bunch up in step 404 of the process 400, a gap 602 of thin plastic material is produced, as shown in FIGS. 7 and 8.

During the process, the vacuum formed honeycomb structure or cells 414 may be operated in a first state where the sheet 408 is moved through the process 500 for a length of about 1.5 meters to about 2.5 meters over a first time period. Next, the process may be operated in a second state by turning off or interrupting step 502 of the process 500 for the following about 0.2 meters to about 0.4 meters of material for a second time period, which is typically less than the first time period. As a result, for every 2 to 3 meters of continuous material produced on the production line, about 1.5 meters to about 2.5 meters may be the vacuum formed honeycomb structure 302 and about 0.2 meters to about 0.4 meters may comprise the non-vacuum formed or honeycomb structure material. In some embodiments, the spaces ranging between about 0.2 meters to about 0.4 meters either comprise formed, but not protruding/stood up thin plastic core material, or in the case of the vacuum forming step being interrupted, about 0.2 meters to about 0.4 meters of the thin sheet 408 or other thin plastic core material.

In some embodiments, step 502 of the process 500 proceeds uninterrupted for about 75% to about 95% of a predetermined time of operation of the process. In particular embodiments, the step 502 of the process 500 is uninterrupted for about 88% to about 92% of the predetermined amount of time. For example, if the process 500 proceeds at a predetermined speed of 3 meters per minute, the step 502 of the process 500 proceeds uninterrupted for about 50 seconds to about 56 seconds, is interrupted for about 4 seconds to about 10 seconds, and then repeats with the aforementioned time intervals of uninterrupted and interrupted time periods to produce the honeycomb structure 302 with the gap 602.

In other embodiments, the ratio between a time interval of step 502 being uninterrupted is between about 20:1 to about 5:1 and, in particular embodiments, between about 10:1 to about 7:1. Of course, it should be understood that other material lengths, time intervals, and/or gap lengths may be used in coordination with one another.

Leaving step 502, the material enters step 504 where the reinforced material 304 may be inserted into the aforementioned gap 602 created from step 502. In some embodiments, the reinforced material 304 comprises a high density polyethylene, a low density polyethylene, a polyethylene terephthalate, a polypropylene, combinations, and/or the like. In one embodiment, a material handling robot may be used to insert the reinforced material 304 into the gap 602. After the reinforced material 304 is positioned in step 506, both the honeycomb structure 302 and the reinforced material 304 enter a subsequent conveyor belt. In some embodiments, the subsequent conveyor belt includes two opposed conveyor belts positioned above and below the material. Heat and/or pressure may be applied at a predetermined temperature and/or a predetermined pressure to join the honeycomb structure 302 with the reinforced material 304. The heat and/or pressure applied in step 506 may also be designed to calibrate the core member 204 to the desired thickness, width, length, etc.

The predetermined temperature applied in step 506 may range between about 40° C. to about 250° C. In some embodiments, the predetermined temperature may range between about 100° C. to about 200° C., or between about 160° C. to about 190° C. Further, the predetermined pressure may range from about 1 MPa to about 100 MPa. In particular embodiments, the predetermined pressure may range between about 15 MPa to about 40 MPa, or between about 25 MPa to about 30 MPa. The heat and/or pressure may be applied for a predetermined amount of time in order to consolidate and/or weld the plastic network 416 together and/or weld the honeycomb structure 302 to the reinforced material 304. Further, the heat and/or pressure may be applied for a predetermined amount of time in order to calibrate the honeycomb structure 302 to a desired thickness. Additionally, other methods may be used to cut and/or size the material produced in step 506 or to secure the honeycomb structure 302 and the reinforced material 304.

As discussed previously with reference to the process 500, FIGS. 7 and 8 depict the core member 204 provided as a continuous sheet before, and after the reinforced material 304 is inserted within one or more gaps 602 of the honeycomb structure 302 and before the continuous sheet of the core member 204 is sized and/or calibrated.

Figure 9:
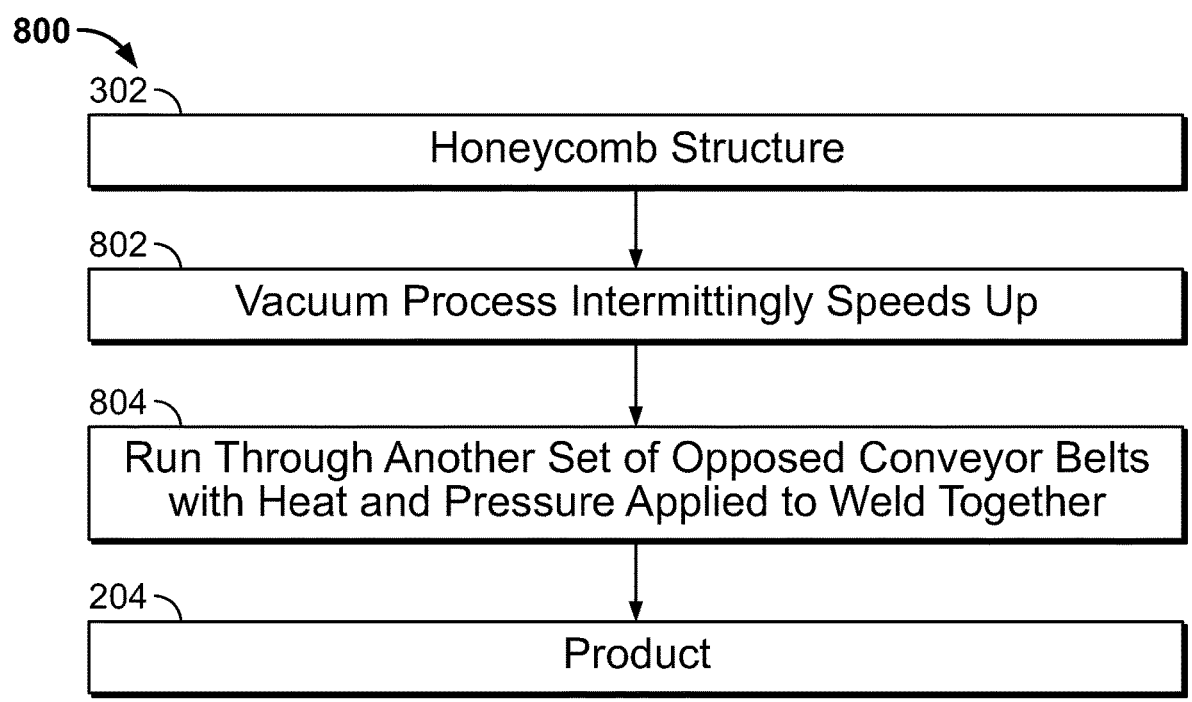
FIG. 9 is a flow chart for an alternative embodiment of an example methodology used to make the reinforced sections of FIG. 3.

FIG. 9 depicts another illustrative process or method 800 for making and reinforcing the core member 204 without the need for inserting a separate reinforced material or plastic strip. The process 800 is schematically illustrated with steps 802 and 804 and is similar to the process shown in FIG. 4. The honeycomb structure 302 from the process 400 is the starting material for the process 800. In step 802, the vacuum forming process or the method 400 intermittently speeds up. In one embodiment, the vacuum forming process or the method 400 is sped up to cause the material in step 404 to bunch up, wrinkle, and/or stand up at a faster pace than when the process 400 is operated at a normal operating speed, which results in the cells 414 and/or a portion of the plastic network 416 to collapse. In other words, a portion of the plastic network 416 may collapse, thereby causing the material to pack more tightly together to form a solid reinforced section that is substantially similar in structure and function to the reinforced material 304. Further, in this embodiment, the reinforced material 304 is similar in composition and material to the honeycomb structure 302.

In some embodiments, the vacuum formed plastic material or cells 414 may be made for a length of about 1.5 meters to about 2.5 meters at the normal operating speed, and for the next about 0.2 meters to about 0.4 meters of material, the process 400 may be sped up. As a result, during the time of increased speed, the honeycomb structure 302 is compacted and folded to form the reinforced material 304. Put differently, the process 400, i.e., the vacuum forming process, may proceed at a normal operating speed for about 75% to about 95% of a predetermined time of operation of the process, is sped up for about 5% to about 25% of the predetermined time of operation of the process, and then may repeat with the aforementioned time percentages at the normal speed and at the accelerated operation speed to produce the honeycomb structure 302.

In other embodiments, the ratio between the time interval of the process 800 being operated at a normal operating speed and a time interval of being operated at an accelerated speed is between about 20:1 to about 5:1 and, in particular embodiments, between about 10:1 to about 7:1.

During operation of the method 800 at the normal operating speed, a conveyor belt of the process 800 may be operated at a speed between about 1.5 meters per minute to about 5 meters per minute. In particular embodiments, the conveyor belt of the method 800 may be operated at a normal operating speed between about 2.5 meters per minute to about 3.5 meters per minute. During operation of the method 800 at the accelerated speed, the conveyor belt of the process 800 may be operated at a speed between about 3 meters per minute to about 10 meters per minute. In particular embodiments, the accelerated speed of the conveyor belt of the process 800 may be at a speed between about 4 meters per minute to about 6 meters per minute. Of course, it should be understood that other material lengths, gap lengths, and/or speeds may be used in coordination with one another.

After step 802, the material enters step 804 where two opposing conveyor belts, one above and one below, may apply heat and/or pressure at a predetermined temperature and/or pressure to weld the stood up shapes produced in step 404 to the solid material formed in step 802 together. The heat and/or pressure applied in step 804 may also work to calibrate the core member 204 to the desired thickness, width, length, etc. Additionally, other methods may be used to cut and size the material in step 804.

The predetermined temperature applied in step 804 may range between about 40° C. to about 250° C. In some embodiments, the predetermined temperature may range between about 100° C. to about 200° C., or between about 160° C. to about 190° C. Further, the predetermined pressure may range from about 1 MPa to about 100 MPa. In particular embodiments, the predetermined pressure may range between about 15 MPa to about 40 MPa, or between about 25 MPa to about 30 MPa. The heat and/or pressure may be applied for a predetermined amount of time in order to consolidate and/or weld the plastic network 416 together and/or weld the honeycomb structure 302 to the reinforced material 304. Further, the heat and/or pressure may be applied for a predetermined amount of time in order to calibrate the honeycomb structure 302 to a desired thickness.

Figure 10:
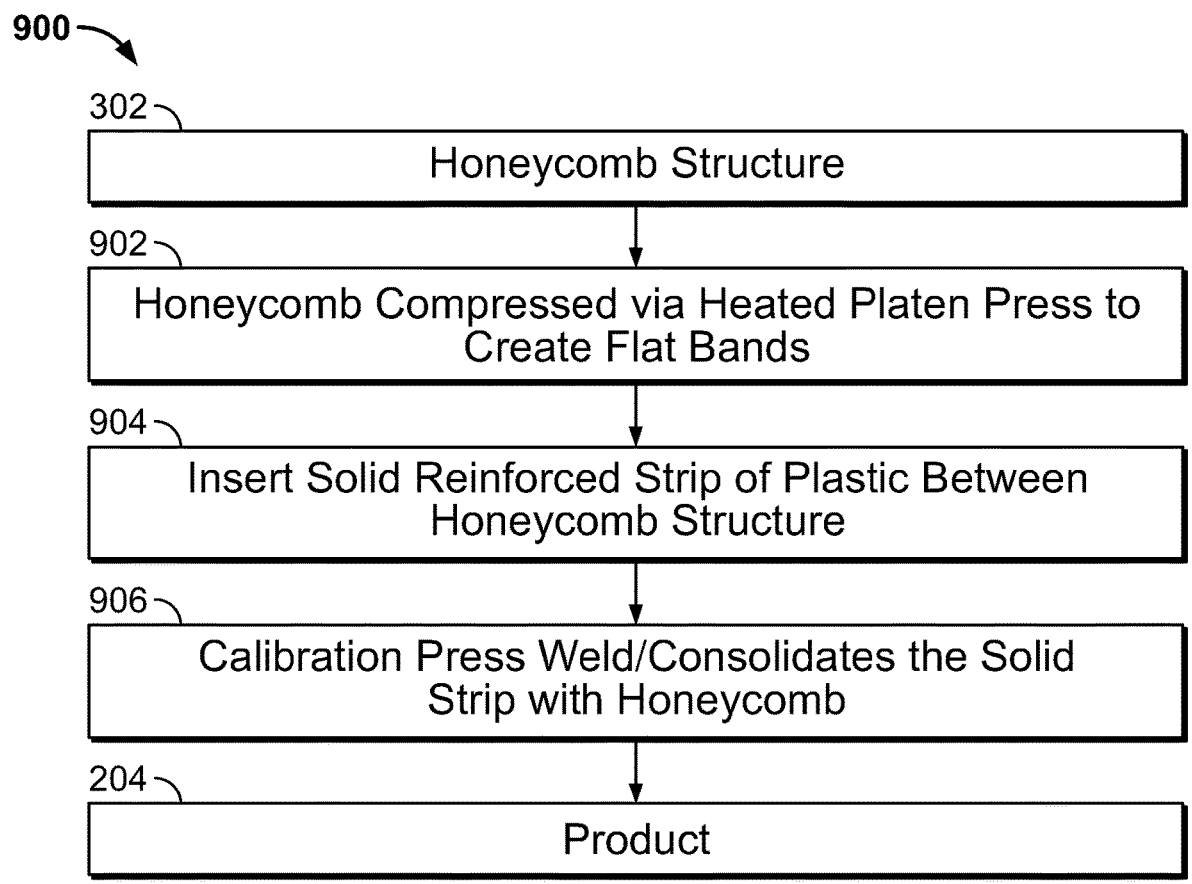
FIG. 10 is a flow chart for a further embodiment of an example methodology used to make the reinforced sections of FIG. 3.

FIG. 10 depicts an illustrative process or method 900 for making the core member 204. The process 900 is schematically illustrated with multiple steps 902, 904, and 906. The honeycomb structure 302 described with respect to the process 400 depicted in FIG. 4 is provided as the starting material for the process 900. In step 902, a section of the honeycomb structure 302 may be run through a heated platen press or similar process to compress various sections of the honeycomb structure 302 to create bands of compressed material, i.e., gaps 602, discussed previously. In this embodiment, the gaps 602 may range between about 0.1 meters to about 0.5 meters and, in particular embodiments, between about 0.2 to about 0.4 meters.

Leaving step 902, the material enters step 904 where the reinforced material 304 (comprising HDPE, LDPE, PET, PP, or the like) may be inserted in the aforementioned gap 602 from step 902. In one embodiment, a material handling robot may be used to insert the reinforced material 304, e.g., a solid plastic strip, into one or more gaps 602. In step 906, both the honeycomb structure 302 and the reinforced material 304 may enter opposed conveyor belts which are positioned above and below the material. Heat and/or pressure may then be applied at a predetermined temperature and/or a predetermined pressure to weld the honeycomb structure 302 to the reinforced material 304 and the heat and/or pressure applied in step 906 may also work to calibrate the core member 204 to the desired thickness, width, length, etc.

The predetermined temperature applied in step 906 may range between about 40° C. to about 250° C. In particular embodiments, the predetermined temperature may range between about 100° C. to about 200° C., or between about 160° C. to about 190° C. Further, the predetermined pressure may range from about 1 MPa to about 100 MPa. In particular embodiments, the predetermined pressure may range between about 15 MPa to about 40 MPa, or between about 25 MPa to about 30 MPa. Additionally, other methods may be used to cut and size the material in step 906. Additionally, other methods may be used to cut and size the material in step 906. The heat and/or pressure may be applied for a predetermined amount of time in order to consolidate and/or weld the plastic network 416 together and/or weld the honeycomb structure 302 to the reinforced material 304. Further, the heat and/or pressure may be applied for a predetermined amount of time in order to calibrate the honeycomb structure 302 to a desired thickness.

After the core member 204 has been produced using the method discussed above, the composite panel 112 may be produced. In some embodiments, the core member 204 may be provided to a process where the inner sheet 200 and/or the outer sheet 202 may be fastened to the core member 204. For example, a suitable adhesive may be placed onto the inner sheet 200 and/or the outer sheet 202, and then the inner sheet 200 and/or the outer sheet 202 may be positioned on a top and a bottom surface, respectively, of the core member 204. In further embodiments, one or more of the core members 204 may be placed adjacent to and/or on top of one another, and then the inner sheet 200 and/or the outer sheet 202 may be positioned on a top and/or a bottom of the one or more core members 204. An amount of heat at a predetermined temperature and/or a force at a predetermined pressure may then be applied to the composite panel 112 to weld the inner sheet 200 and/or the outer sheet 202 to the core member 204.

The composite panel 112 may be provided in a variety of shapes and sizes. For example, when the composite panel 112 is provided as a rectangular panel, the composite panel 112 may generally be defined by a length, a width, and a thickness. In some embodiments, the length dimension of the composite panel 112 may range between about 2 meters to about 3.5 meters and, in particular embodiments, the length dimension may range between about 2.2 meters to about 3 meters. Further, in some embodiments, the width dimension may range between about 0.5 meters to about 2 meters and, in particular embodiments, the width dimension may range between about 1 meter to about 1.5 meters. The composite panel 112 may also have a predetermined thickness between about 2 millimeters to about 30 millimeters and, in particular embodiments, the composite panel 112 may have a predetermined thickness between about 5 millimeters to about 10 millimeters.

Although the composite panel 112 and the core member 204 discussed herein have been discussed with respect to a tractor trailer application, it should be appreciated that the composite panel 112, core member 204, and/or any associated parts may be used in other applications such as, for example, other automotive and transportation applications, furniture applications, architecture applications and building materials, packing materials and logistics applications, aerospace applications, and the like.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

I claim:

1. A composite panel, comprising:
   an inner sheet and an outer sheet disposed opposite of the inner sheet, and
   a core member positioned between the inner and outer sheets, the core member comprising a continuous material including a) a partially hollow structure and b) a gap section, the gap section extending between a first end and a second end of the partially hollow structure and having a shorter height than the partially hollow structure to create a gap, wherein the partially hollow structure has a lower volumetric mass density than the gap section as a result of the gap section being formed by an interruption during a vacuum forming process of the core member or compressing a portion of the partially hollow structure.

2. The composite panel of claim 1 further including a reinforced material, wherein the reinforced material is designed to be inserted into the gap and coupled to the partially hollow structure.

3. The composite panel of claim 2, wherein the reinforced material is coupled to the partially hollow structure adjacent the first end thereof.

4. The composite panel of claim 3, the reinforced material is coupled to the partially hollow structure adjacent the second end thereof.

5. The composite panel of claim 2, wherein the partially hollow structure is at least 80% of a volume of the core member.

6. The composite panel of claim 5, wherein the partially hollow structure is at least 95% of the volume of the core member.

7. The composite panel of claim 2, wherein the reinforced material is selected from the group consisting of high density polyethylene, high density polypropylene, low density polyethylene, polyethylene terephthalate, polypropylene, and combinations thereof.

8. The composite panel of claim 2, wherein the composite panel has a length dimension ranging between about 2.5 meters to about 3.5 meters.

9. The composite panel of claim 8, wherein the composite panel has a width dimension ranging between about 1 meter to about 2 meters.

10. The composite panel of claim 2, wherein the partially hollow structure is provided as a network of hexagonal cells.

11. The composite panel of claim 2, wherein the reinforced material is designed to be welded to the partially hollow structure.

12. The composite panel of claim 2, wherein the partially hollow structure has a lower volumetric mass density than the reinforced material.

13. The composite panel of claim 1, wherein the partially hollow structure is interrupted by a plurality of gap sections.

14. The composite panel of claim 1, wherein the gap section is created by interrupting the vacuum forming process.

15. The composite panel of claim 2, wherein the reinforced material is a solid material that fills the gap.

* * * * *